United States Patent
Clark

(10) Patent No.: US 10,940,516 B2
(45) Date of Patent: Mar. 9, 2021

(54) SEAL FOR USE IN CRYOGENIC APPLICATIONS

(71) Applicant: Primetals Technologies Austria GmbH, Linz (AT)

(72) Inventor: Michael Trevor Clark, Sheffield (GB)

(73) Assignee: PRIMETALS TECHNOLOGIES AUSTRIA GMBH

( * ) Notice: Subject to any disclaimer, the term of this patent is extended or adjusted under 35 U.S.C. 154(b) by 0 days.

(21) Appl. No.: 15/526,540

(22) PCT Filed: Nov. 11, 2015

(86) PCT No.: PCT/EP2015/076308
§ 371 (c)(1),
(2) Date: May 12, 2017

(87) PCT Pub. No.: WO2016/083128
PCT Pub. Date: Jun. 2, 2016

(65) Prior Publication Data
US 2017/0304882 A1    Oct. 26, 2017

(30) Foreign Application Priority Data

Nov. 26, 2014 (GB) ..................................... 1420965

(51) Int. Cl.
*B21B 27/10* (2006.01)
*F16J 15/40* (2006.01)

(52) U.S. Cl.
CPC ............... *B21B 27/10* (2013.01); *F16J 15/40* (2013.01); *B21B 2027/103* (2013.01)

(58) Field of Classification Search
CPC .... F16J 15/40; B21B 2027/103; B21B 27/10; B21B 27/06; B21B 31/078; F01D 11/04; F01D 11/06
See application file for complete search history.

(56) References Cited

U.S. PATENT DOCUMENTS

| | | | | |
|---|---|---|---|---|
| 1,873,267 A | * | 8/1932 | Bigelow | F16J 15/26 277/516 |
| 2,720,011 A | * | 10/1955 | Krupp | B64D 15/02 277/646 |
| 3,572,726 A | * | 3/1971 | Bottoms | F16J 15/36 277/391 |

(Continued)

FOREIGN PATENT DOCUMENTS

| DE | 30 03 001 A1 | 7/1981 |
|---|---|---|
| EP | 0 205 296 A2 | 12/1986 |

(Continued)

OTHER PUBLICATIONS

International Search Report dated Jan. 27, 2016 in corresponding PCT International Application No. PCT/EP2015/076308.

(Continued)

*Primary Examiner* — Eugene G Byrd
(74) *Attorney, Agent, or Firm* — Ostrolenk Faber LLP

(57) ABSTRACT

A sealing device includes a flexible seal (10), a source of gas (15), a gas inlet (14) into the seal, and a gas outlet (17) from the seal 10, 17 whereby gas flows through the seal. A cryogenic source cools the seal and the gas from the cryogen helps seal the seal to the roll and to keep the seal flexible as the gas flows.

11 Claims, 4 Drawing Sheets

(56) References Cited

U.S. PATENT DOCUMENTS

| | | | | |
|---|---|---|---|---|
| 3,815,926 A * | 6/1974 | Vore | ............ | F16J 15/40 |
| | | | | 277/563 |
| 3,887,199 A * | 6/1975 | Sundqvist | ............ | F16J 15/32 |
| | | | | 277/431 |
| 4,008,016 A | 2/1977 | Goloff | ............ | 418/92 |
| 4,021,050 A | 5/1977 | Powers | ............ | 277/75 |
| 4,465,086 A | 8/1984 | Coppe et al. | ............ | 134/64 R |
| 4,534,569 A * | 8/1985 | Ishitani | ............ | B63H 23/321 |
| | | | | 277/351 |
| 6,874,344 B1 * | 4/2005 | Junius | ............ | B21B 1/36 |
| | | | | 72/201 |
| 8,753,014 B2 * | 6/2014 | Devitt | ............ | F16C 32/0618 |
| | | | | 277/358 |
| 8,978,437 B2 | 3/2015 | Malas et al. | ............ | 72/201 |
| 9,732,621 B1 * | 8/2017 | Sexton | ............ | F01D 11/025 |

FOREIGN PATENT DOCUMENTS

| | | | |
|---|---|---|---|
| GB | 999928 | 7/1965 | |
| GB | 1 491 391 | 11/1977 | |
| GB | 1 594 732 | 8/1981 | |
| JP | S60-55600 U | 4/1985 | |
| JP | H01-127110 A | 5/1989 | |
| JP | H04-59106 | 2/1992 | |
| JP | H10-5827 A | 1/1998 | |
| WO | WO 2012/110241 A1 | 8/2012 | |
| WO | WO-2012110241 A1 * | 8/2012 | ............ B21B 27/10 |

OTHER PUBLICATIONS

Written Opinion dated Jan. 27, 2016 in corresponding PCT International Application No. PCT/EP2015/076308.

Combined Search and Examination Report dated Apr. 22, 2015 in corresponding United Kingdom Patent Application No. 1420965.4.

Reply to Combined Search and Examination Report filed Sep. 2, 2015 in corresponding United Kingdom Patent Application No. 1420965.4.

Search Report dated Nov. 3, 2015 in corresponding United Kingdom Patent Application No. 1420965.4.

Notice of Reasons for Rejection dated Oct. 22, 2018 in corresponding Japanese Patent Application No. 2017-528158 with English translation.

* cited by examiner

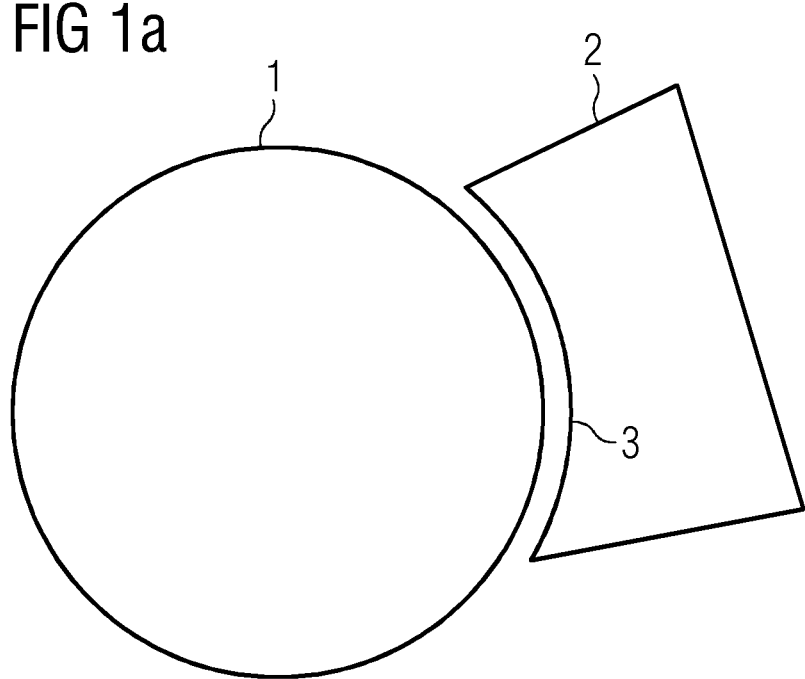
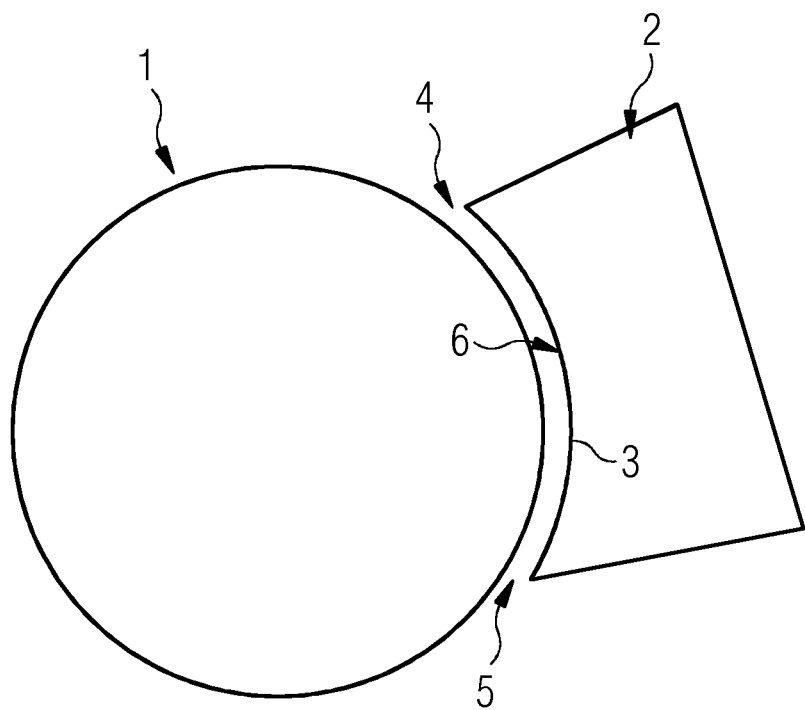

SEAL FOR USE IN CRYOGENIC APPLICATIONS

CROSS-REFERENCE TO RELATED APPLICATIONS

The present application is a 35 U.S.C. §§ 371 national phase conversion of PCT/EP2015/076308, filed Nov. 11, 2015, which claims priority of United Kingdom Patent Application No. 1420965.4, filed Nov. 26, 2014, the contents of which are incorporated by reference herein. The PCT International Application was published in the English language.

TECHNICAL FIELD

This invention relates to a seal and a method of sealing, in particular for use in cryogenic applications.

TECHNICAL BACKGROUND

Cryogenic cooling of work rolls requires ways of preventing escape of the cryogen from the area in which it is required to avoid condensation and freezing of parts outside that area.

WO2012110241 describes an apparatus for cooling a work roll which includes a shielding means to create an essentially closed space within which the cryogenic coolant is sprayed. Various methods of sealing the closed space against the work roll are described including a gas seal and plastic material. A gas seal is preferred across the width of the roll at the top and bottom of the chamber because a plastic seal or other mechanical seal could potentially damage the surface finish of the roll. However, at the sides of the chamber it is more difficult to achieve a good gas seal because the roll diameter changes due to wear.

SUMMARY OF THE INVENTION

In accordance with a first aspect of the present invention, a sealing device comprises a flexible seal, a source of gas, a gas inlet to the seal, and a gas outlet from the seal, whereby gas flows through the seal. The flexible seal comprises a first sealing member and a second sealing member. The first sealing member comprises a flexible gas chamber and the second sealing member comprises a solid body. The flexible gas chamber is configured and located to apply pressure to the solid body.

The gas flowing through the seal keeps the seal flexible and applies pressure to maintain the sealing effect. Preferably, the device further comprises a heat supply, whereby the gas is heated at its source before flowing through the seal. A continuous flow of warmed gas through the seal keeps the seal material at an elevated temperature to maintain its flexibility and improve the quality of the seal.

The flexible seal may comprise a single flexible gas chamber, suitably reinforced where it contacts another surface to form a seal, with gas flowing through.

The gas flow may be only through the flexible gas chamber, keeping that warm and conducting heat to the solid body. Preferably, the solid body is provided with one or more gas passages therethrough, to receive gas from the flexible gas chamber. The gas supply to the flexible gas chamber presses the seal against the roll, and keeps the seal warm.

Preferably, at least one of the gas passages exits the solid body where the solid body contacts a work roll in a rolling mill stand. The gas exiting the solid body helps to prevent leakage past the seal.

Preferably, the source of gas is a cryogenic liquid. Preferably, the gas is nitrogen.

In accordance with a second aspect of the present invention, a rolling mill stand comprises a pair of work rolls and a cryogenic cooling system. The work rolls are cooled by cryogenic liquid supplied within a cooling chamber of the cooling system. A sealing device according to the first aspect seals a gap between the cooling chamber and the work roll.

A method of sealing a chamber adjacent to a work roll of a rolling mill stand, during rolling, comprises providing a seal at each edge of the work roll; and supplying a flow of gas through a flexible gas chamber in contact with the seal to apply pressure to the seal. Preferably, the method further comprises heating the gas before supplying it to the flexible gas chamber.

Preferably, the method further comprises supplying the gas from the flexible gas chamber through passages in the or each seal to exit the seal at an interface between the seal and the work roll. The gas flow between the seal and the work roll surface, significantly reduces or prevents, leakage of cryogenic gas past the seal.

BRIEF DESCRIPTION OF THE DRAWINGS

An example of a seal and a method of sealing according to the present invention will now be described with reference to the accompanying drawings in which:

FIG. 1A illustrates an example of a gas seal for a rolling mill with a shroud of the type described in WO2012110241;

FIG. 1B illustrates the effect of change in roll diameter on the gas seal of FIG. 1A;

FIG. 5 schematically illustrates a rolling mill stand with a gas seal herein on each roll thereof.

BACKGROUND OF THE INVENTION

Figure 2A:
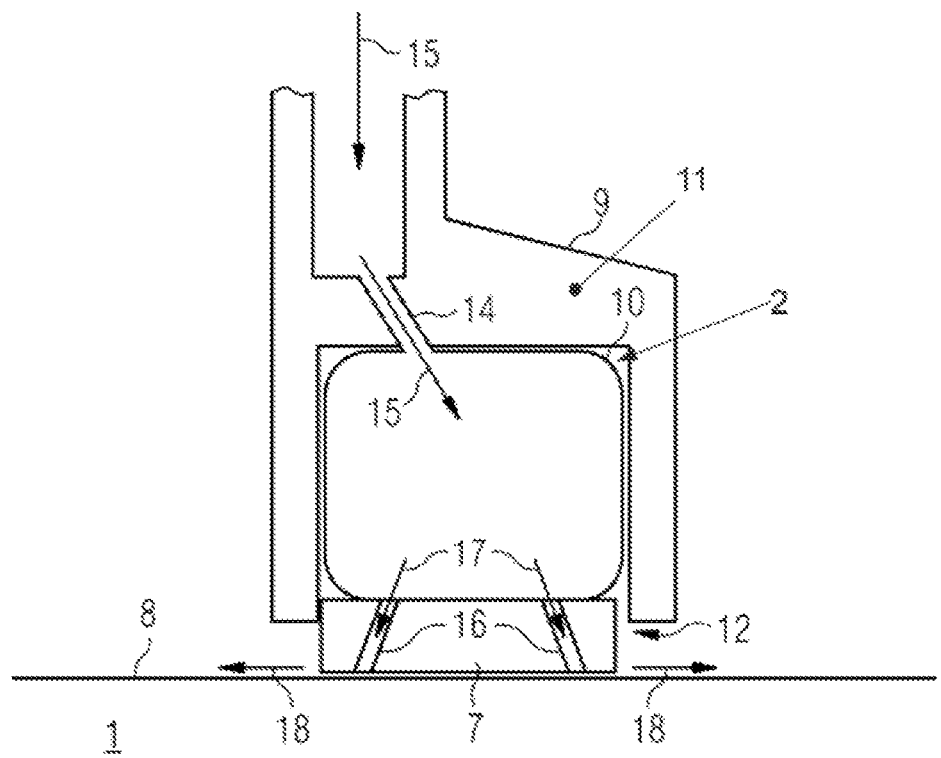
FIG. 2A is a section through one example of a gas seal according to the present invention, for a rolling work roll enclosure.

In a rolling mill using cryogenic cooling of the work rolls and/or the strip or product being rolled, a shield, or chamber is provided to contain the coolant in the desired area and prevent it from escaping and causing moisture in the surroundings to condense and damage the strip. This shield is positioned close to, but not in direct contact with, the work roll and typically a gas seal is used to prevent the cryogenic coolant from escaping between the edges of the shield and the work roll surface. FIG. 1A illustrates this arrangement, with a gas seal 3 between a work roll 1 and a shield 2. Initially, the gap being sealed by the gas seal is substantially constant along the length of the surface of the work roll. Gas seals require a constant and relatively small gap to work effectively.

After a period of use, the work rolls wear down or the surface finish is damaged and the rolls have to be re-ground. Thus, each work roll diameter changes, relative to the original roll diameter. The problem is that the seal is designed for the original roll diameter and cannot cope with multiple roll diameters. As can be seen from Fig. B, if the edge seal is simply a gas seal, then when the roll diameter changes, the gap for the gas seal changes at the edges and is no longer constant along the arc of the seal. If the gap is bigger along part of the arc, then the whole seal becomes less effective because more of the gas flows through the larger gap and the pressure of the gas seal drops.

WO2012110241 suggests the use of plastic seals at the edges of the work roll and shield to address the problem of different work roll diameters, but it can be a problem to keep the plastic seal sufficiently flexible to accommodate the different roll diameters. Materials which are sufficiently elastic to accommodate the different roll diameters, such as rubbers, do not generally work very well at cryogenic temperatures, as they lose their elasticity and in some cases become brittle.

DESCRIPTION OF EMBODIMENTS

The present invention addresses the problems of sealing, and of changing or gradually changing multiple work roll diameters by having a seal in which gas pressure is used to push the seal against the surface of the roll and a flow of gas through the seal keeps the seal warm and hence elastic.

Examples of seals for a cryogenic application are illustrated in FIGS. 2A, 2B, 3A and 3B. A section through an edge of the chamber 2 shows a seal 7 positioned on a surface 8 of the work roll 1. A side wall 9 of the chamber 2 is shaped such that a flexible gas chamber 10 may be fitted into a base into a base 11 of the side wall. The side wall 9 is shaped to have an opening 12 in the base, allowing the flexible gas chamber 10 to come into contact with seal 7 on the work roll 1. The seal 7 is flexible and may comprise an elastic material, such as rubber, PTFE, plastic or similar. The flexible gas chamber may comprise an inflatable body, having a tubular, or other suitable shape. In the example shown in FIG. 2A, the seal 7 is forced against the surface 11 of the roll 1 by the flexible gas chamber tube 10. The inflatable tube 10 deforms to take up the shape of the base 11 of the chamber 2 and exerts pressure on the seal 7. In one embodiment, passages 13, 14 are provided in the side wall 9 of the chamber for the flow of gas 15 into the inflatable tube 10. The combination of an inflatable tube and a flexible seal allow the sealing arrangement to easily accommodate different roll sizes. However, the tube and seal may be combined to provide a flexible seal comprising a single flexible gas chamber, suitably reinforced where it contacts another surface to form a seal, with gas flowing through to keep the chamber warm and maintain the flexibility of the sealing part.

Preferably, the gas is warm nitrogen, above the dew point, which can be obtained by letting the liquid cryogen evaporate to a gas. The liquid cryogen may be allowed to warm to room temperature, or heat may be applied. When the nitrogen is in its gaseous state, it may be further warmed to provide a warm enough gas for keeping the inflatable tube and the plastic seal flexible. Nitrogen is preferred, but any dry gas may be used to inflate the tube. Gases containing water vapor, which could leak into the shroud, should be avoided. The continuous flow of warm gas ensures that the walls of the inflatable tube remain warm and hence, stay flexible. If there was no flow of gas through the inflatable tube (i.e. if the tube was simply pressurized), then the material of the tube on the cold side of the wall would get colder and colder and lose its elastic properties.

The gas flow may be provided only through the tube 14 to keep the tube warm and flexible and apply pressure to hold the seal 7 against the roll, relying on conduction of heat to the seal to keep the seal flexible. An improvement is to provide passages 16, 17 in the seal. The passages allow the flow of gas 17 through the inflatable tube 10 and through the seal 7. The gas exiting at 18 from a surface of the seal in contact with the surface 8 of the work roll 1 allows a continuous flow of gas.

Figure 3A:
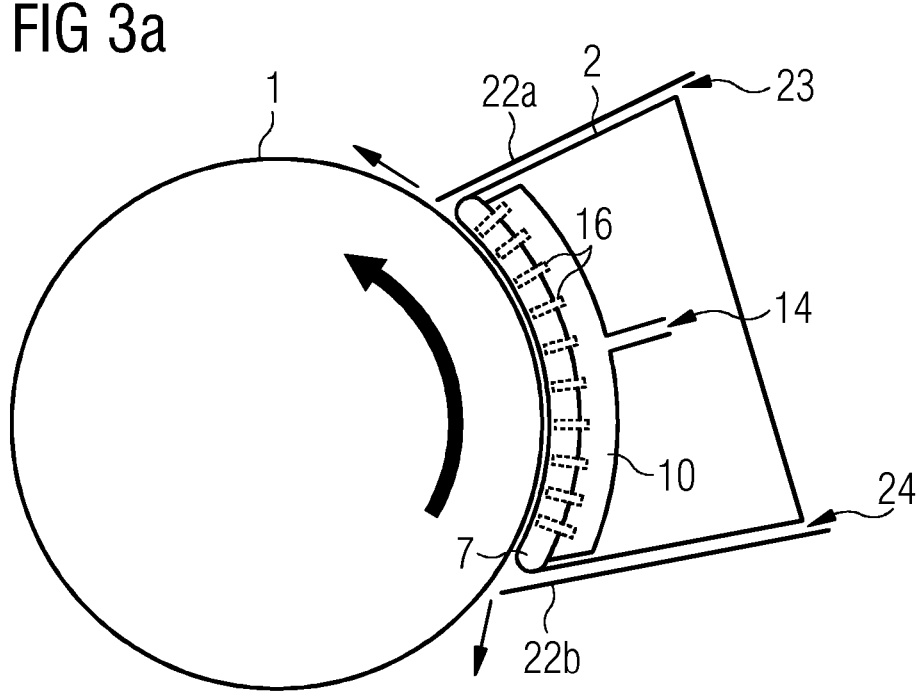
FIG. 3A illustrates the example of FIG. 2A in place between a work roll and shroud.

FIG. 3A shows the arrangement from an end, with a supply of warm gas 15 through passage 14 into the inflatable tube 10 and then through multiple passages 16 in the seal 7. The continuous flow of warm gas 15, 17 ensures that the seal itself stays warm and flexible, rather than becoming too cool and losing its elasticity and hence not sealing properly, or even becoming brittle and failing.

The continuous flow of warm gas also helps to ensure that no cold gas escapes from the chamber 2, past the seal 7. Even if the seal does not create a perfect gas tight seal against the surface 8 of the roll, the flow of warm gas 18 out of the face of the seal 7 ensures that cold gas cannot escape from and that air cannot get into the chamber.

Figure 2B:
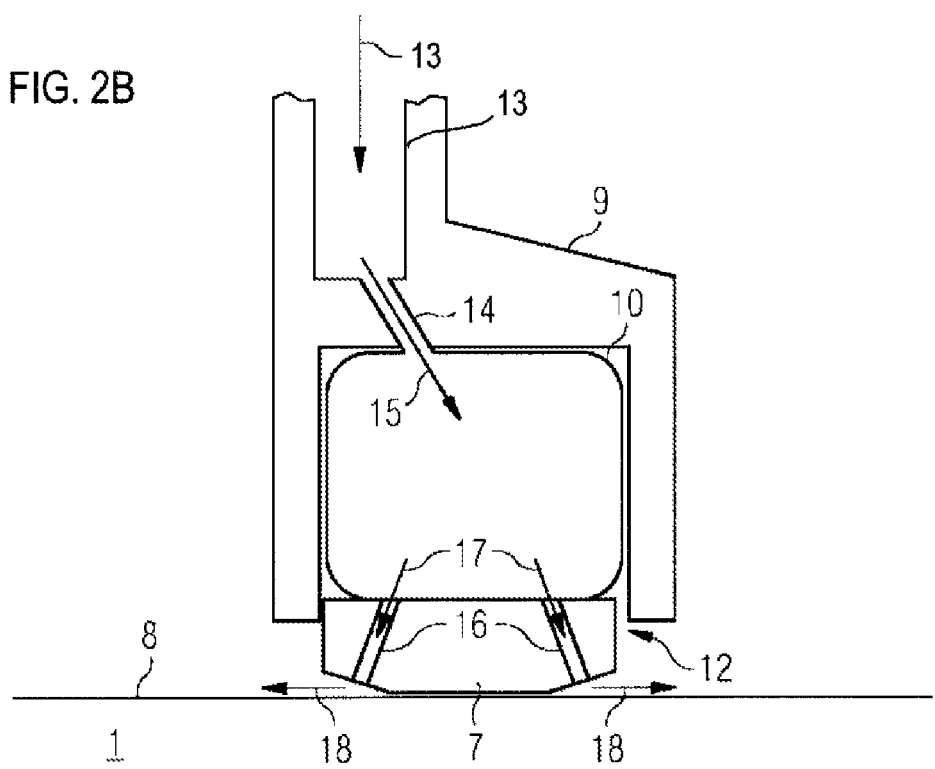
FIG. 2B is a section through another example of a gas seal according to the present invention, for a rolling work roll enclosure.

A further feature which may be provided to increase the volume of flow through the seal passages 16 is to form grooves in the seal surface, or preferably to shape the surface of the seal, for example, as a convex surface where the contact face is in the center and the gas passages are at either side of the contact face, as illustrated in FIG. 2B.

Figure 3B:
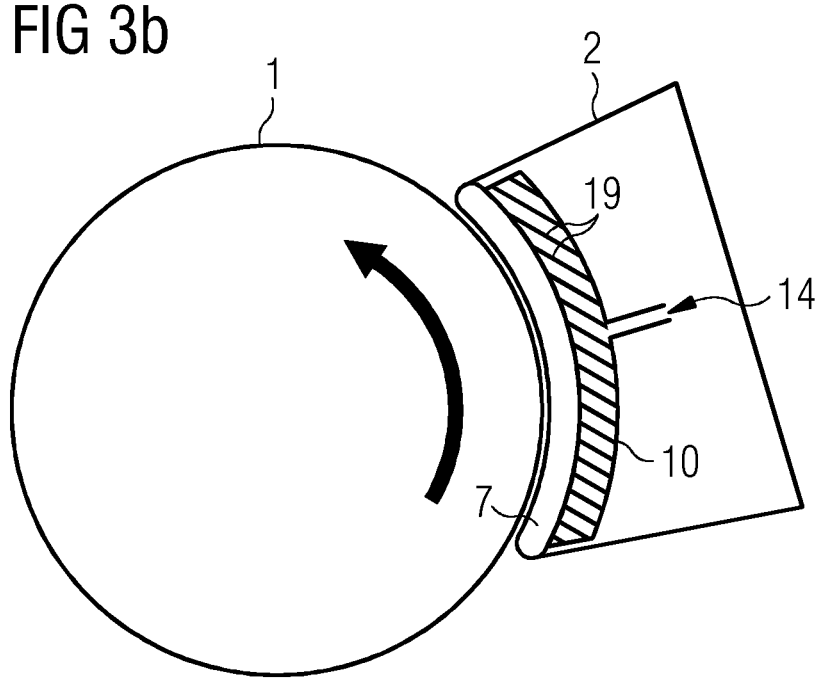
FIG. 3B illustrates the example of FIG. 2A in place between a work roll and another shroud, including reinforcing.
Figure 4:
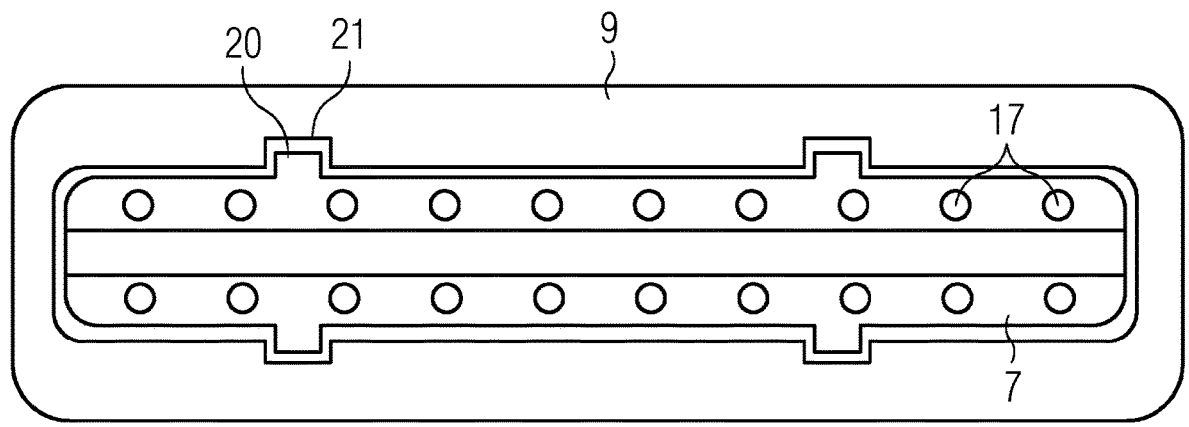
FIG. 4 illustrates an example of a mechanism to prevent the seal of the present invention from rotating with the work roll, in use.

When the work rolls are rolling a strip or plate, there is friction between the seal surface and the roll surface, and this friction imparts a force to the seal which needs to be counteracted, in order to stop the seal from rotating with the roll. The walls of the inflatable tube may be adapted to restrain the seal from rotating, or the seal may be provided with protrusions which engage with holes, or recesses in the base of the chamber side wall, or connect to the chamber in a similar fashion. FIG. 3B illustrates the tube reinforced with belts 19 so that the tube can hold the seal in place. The back of the tube, away from the seal, is attached to the shroud wall 9 (FIGS. 2A and 2B) and the front of the tube is attached to the seal 7. FIG. 4 illustrates how protrusions 20 and recesses 21 may be provided to prevent rotation.

The end seals as described above may be used in combination with an air knife, as used in WO2012110241, across the central part of the work roll for the top and bottom work roll to chamber seals. The air knife 22a, 22b can be seen in FIG. 3A, with gas supplies 23, 24 to the top air knife 22a and bottom air knife 22b.

The present invention provides a seal which can accommodate different roll diameters by using a flexible material for the sealing and pressing it in place and which can also handle cryogenic temperatures by keeping that material flexible using the warm gas flow. As mentioned above, prior art systems may use gas or plastic seals, but these both have problems with maintaining an effective seal when the roll changes shape after regrinding, or due to the cryogenic temperatures at which the seal must perform.

An alternative embodiment would be to dispense with the inflatable tube and simply pressurize the back of the seal itself with gas. To make this work the seal itself would effectively become a piston and it would need seals against the walls within which it moves. This arrangement is more difficult to seal properly than the inflatable tube design and it would need additional guiding and restraints.

Another solution would be to spring load the seal and use only the gas for keeping the seal warm. If leaf or blade type springs were used, they would restrain the seal from rotation with the roll. The complication with this design is how to get the gas connections to the seal. One possibility is to retain the chamber where the inflatable tube sits. But, then the seal needs piston seals or similar. Another possibility is to have the gas supply via a flexible tube or tubes connected directly to the seal. But, this is more complex than the inflatable tube design.

The advantage of the inflatable tube arrangement is that it achieves multiple requirements in one easily manufactured and assembled unit. It restrains and guides the seal, it pressurizes the seal against the roll and it provides a simple way of supplying the gas to the seal.

FIG. 5 shows a two roll rolling mill stand 30 supporting two rolls 1 parallel to each other and rolling a strip, strand, etc. between them. Illustrated are a respective seal 7, 10 toward an edge of each of the rolls, defining a cryogenic cooling system with a cooling chamber 2 of the cooling system and the seal 7, 10, which seals a gap between the cooling chamber and the work roll.

The invention claimed is:

1. A device for sealing a cooling chamber for cooling of work rolls in a rolling mill, the device comprising:
   a cooling chamber located adjacent to a work roll of a rolling mill stand wherein the work roll is cooled by a cryogenic gas supplied within the cooling chamber;
   a flexible seal for sealing a gap between the cooling chamber and the work roll, the flexible seal maintaining the cryogenic gas within the cooling chamber;
   a gas inlet leading gas from a source of gas to the flexible seal;
   the flexible seal comprising a first sealing member comprising an inflatable tube enclosed within the cooling chamber and a second sealing member comprising a solid, flexible body; and
   the inflatable tube being configured and operable to apply pressure to the solid body with a continuous flow of warm gas from the gas inlet so as to press the solid body against an object when the object is rotated by the work roll, wherein the solid body defines one or more gas passages therethrough, to receive gas passing from the inflatable tube and which permit the gas passing from the inflatable tube to exit the solid body through at least one of the one or more passages, the warm gas flow keeping the seal flexible in the presence of the cryogenic gas.

2. A device according to claim 1, wherein at least one of the gas passages exits the solid body where the solid body contacts a work roll in a rolling mill stand.

3. A device according to claim 1, wherein the source of gas is a cryogenic liquid.

4. A device according to claim 1, wherein the source of gas is nitrogen.

5. A rolling mill stand comprising a pair of work rolls and a cryogenic cooling system, located and configured so that the work rolls are cooled by a cryogenic liquid;
   a cooling chamber of the cooling system to which the liquid is supplied; and
   a sealing device according to claim 1, for sealing a gap between the cooling chamber and the work roll.

6. A method of sealing a cooling chamber for cooling of work rolls in a rolling mill, the method comprising:
   providing a sealing device according to claim 1 located toward each lateral edge of at least one work roll in a rolling mill;
   providing means for preventing rotation of the seal with the work roll;
   supplying a continuous flow of heated gas warm enough to cause the seal to be flexible;
   supplying the heated gas through an inflatable tube which is in contact with a solid body of the seal for causing the inflatable tube to apply pressure to the solid body by using the continuous flow of warm gas through the inflatable tube from a gas inlet of the inflatable tube through at least one gas outlet defined by and extending through the solid body.

7. A method according to claim 6, further comprising supplying the warm gas from the inflatable tube and through passages in the seal for causing the gas to exit the seal at an interface between the seal and the work roll.

8. A method according to claim 6, further comprising heating the gas before the gas enters the inflatable tube to a level that warms the second sealing member to maintain its flexibility.

9. A sealing device according to claim 1, wherein the solid body of the second sealing member is flexible such that pressure applied on the second sealing member by the first sealing member presses the second sealing member against a work roll on which the sealing device is applied even if the shape of the work roll changes.

10. A sealing device according to claim 9, further comprising a second chamber sized and configured to receive the inflatable tube, and the chamber is open to the second sealing member, wherein the second chamber causes the inflatable tube to apply pressure on the second sealing member.

11. A method according to claim 7, further wherein the inflatable tube is a cryochamber, and wherein the flow of warm gas supplies heat to the second sealing member for maintaining the flexibility thereof under pressure from the first sealing member.

* * * * *